United States Patent [19]

Hamada et al.

[11] Patent Number: 5,321,562
[45] Date of Patent: Jun. 14, 1994

[54] DATA RECORDING AND/OR REPRODUCING APPARATUS

[75] Inventors: Shinji Hamada, Tokyo; Yoshikazu Nakamura; Yukio Taniyama, both of Kanagawa, all of Japan

[73] Assignee: Sony Corporation, Tokyo, Japan

[21] Appl. No.: 850,830

[22] Filed: Mar. 13, 1992

[30] Foreign Application Priority Data

| Mar. 17, 1991 | [JP] | Japan | 3-076790 |
| Mar. 17, 1991 | [JP] | Japan | 3-076791 |
| Apr. 30, 1991 | [JP] | Japan | 3-126927 |

[51] Int. Cl.⁵ ............ G11B 5/09; G11B 20/10; G11B 20/14; G11B 20/16
[52] U.S. Cl. ............ 360/48; 360/32; 360/40; 360/39
[58] Field of Search ......... 360/48, 40, 53, 32, 360/135, 33.1, 39

[56] References Cited

U.S. PATENT DOCUMENTS

| 4,016,603 | 4/1977 | Ottensen | 360/135 |
| 4,072,987 | 2/1978 | Walker | 360/48 |
| 4,546,390 | 10/1985 | Konishi et al. | 360/33.1 |
| 4,899,232 | 2/1990 | Odaka et al. | 360/48 |
| 5,029,022 | 7/1991 | Odaka et al. | 360/48 |

FOREIGN PATENT DOCUMENTS

| 0272130 | 6/1988 | European Pat. Off. . |
| 0338781 | 10/1989 | European Pat. Off. . |
| 0410722A2 | 1/1991 | European Pat. Off. . |

Primary Examiner—Donald Hajec
Assistant Examiner—T. N. Forbus, Jr.
Attorney, Agent, or Firm—William S. Frommer; Alvin Sinderbrand

[57] ABSTRACT

A data recording and/or reproducing apparatus records and/or reproduces file data by processing the file data on the unit of a predetermined block length, a data block and information data for identifying the data block on predetermined unit regions. A supplement data is recorded on a region other than the region recorded the file data, the block data and the information data for identifying within the unit regions. Thereby these data are recorded and/or reproduction processed at every predetermined units so that the bit error rate is remarkably improved.

9 Claims, 10 Drawing Sheets

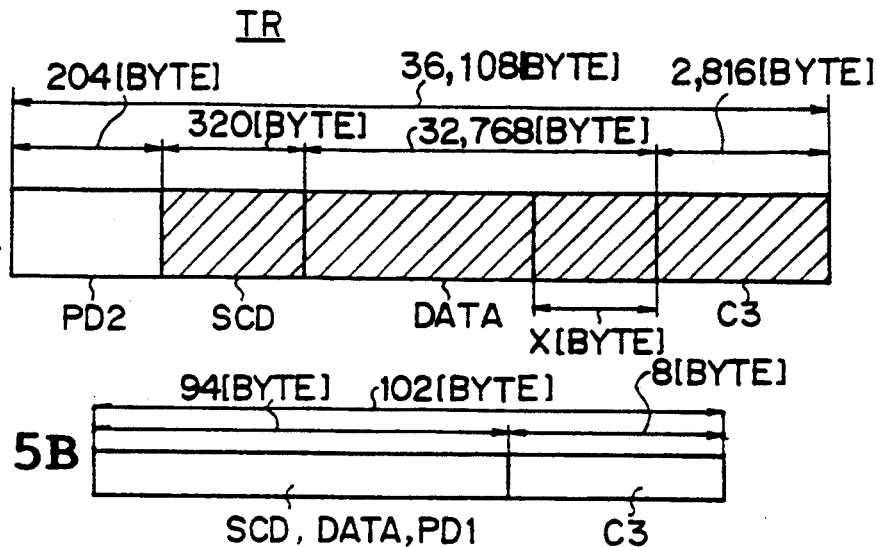
FIG. 5A
FIG. 5B
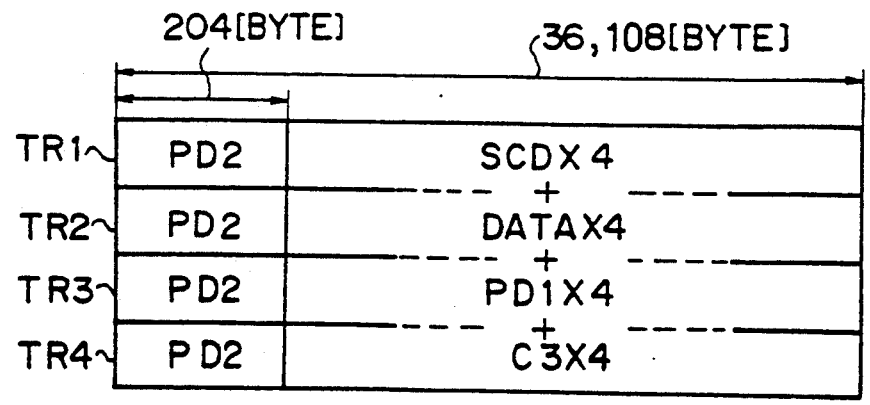
FIG. 6

DATA RECORDING AND/OR REPRODUCING APPARATUS

BACKGROUND OF THE INVENTION

This invention relates to a data recording and/or reproducing apparatus, and more particularly is suitable to apply a computer external memory and the like, for example.

In a magnetic tape recording and reproducing apparatus of this kind, proposed hitherto is the so-called ID-1 format data recorder (ANSI×3.175-1990 19 mm Type ID-1 Recorded Instrumentation), wherein recording tracks are formed obliquely in sequence on a magnetic tape, and thus desired data can be recorded and reproduced in high density.

That is, as shown in FIG. 1, in such data recorder, a magnetic tape I is wound on a rotary drum rotating at a predetermined speed, the magnetic tape 1 is run at a predetermined speed, thereby forming recording tracks TR ( . . . TR1, TR2, TR3, TR4, TR1, TR2, . . . ) obliquely in sequence by the magnetic head mounted on the rotary drum, and thus desired data is recorded on the recording track TR1.

Further in this case, the data recorder forms recording tracks TA, CTL and TC extending longitudinally on both upper and lower ends of the magnetic tape 1, and a track set identification (ID) of the recording tracks TR is recorded on the recording track CTL.

Here the track set identification (ID) i the absolute position information beginning from the first of the magnetic tape 1, put between predetermined synchronizing signals, and is recorded at a 4-track period with reference to the recording tracks TR.

Further the recording tracks TA and TC are ready for recording user's controlling data and others, thus data recorded in high density on the recording tracks TR can be searched simply by reproducing the recording tracks TA, CTL and TC.

Further in the data recorder, when recording data on the recording tracks TR, an error detecting/correcting parity code comprising the so-called product code is applied to record the data concerned, thereby recording and reproducing desired data securely.

That is, as shown in FIG. 2, after loading in data DATA in a predetermined unit (=36,108[BYTE]), the data recorder divides the data DATA into 306 blocks, and applies Reed-Solomon error detecting/correcting code (comprising C2 code) at each block.

Further, after dividing the block into a first field FIELD0 and a second field FIELD1, the data recorder applies Reed-Solomon error detecting/correcting code (comprising C1 code) so as to come orthogonal with the C2 code.

Thus in the data recorder, a bit error rate can be enhanced by correcting erroneous reproducing data by means of the C1 and C2 codes in reproducing.

Further in the data recorder, when recording the data DATA with the C1 and C2 codes applied thereto in the magnetic tape 1, interleaving is effected at every recording tracks TR, thus where a drop-out or the like arises, the data DATA can be reproduced securely.

That is, in the data recorder, with reference to the data DATA inputted in the order indicated by arrows a1, a2, ..., an-1, an, an+1, an+2, ..., ax-1 and ax, the data DATA is recorded by changing the inputting order as indicated by arrows b1, b2, . . . , bn-1 and bn, thereby interleaving the data DATA.

Further in the data recorder in this case, a synchronizing signal SYNC and sync block data ID are added at every predetermined unit (hereinafter called sync block), and preamble and postamble data are added as a whole to record the data DATA.

Thus in reproducing, in the magnetic recording and reproducing apparatus, the synchronizing signal SYNC, the sync block data ID and the data DATA are reproduced on the basis of track sync data included in the preamble, and subjected to deinterleaving on the basis of the synchronizing signal SYNC and the sync block data ID.

Further from interleaving, an error exceeding an error correcting capacity of the C1 and C2 codes is prevented from concentrating into one spot effectively even in case drop-out or the like has arisen.

Meanwhile, in the ID-1 format data recorder for reproducing desired data as described above, a bit error rate $10^{-10}$ which is sufficient practically as the data recording and reproducing apparatus intended mainly for measurement is ensured.

If the bit error rate can be enhanced to $10^{-15}$ or so, then it is conceivable that important data may be safedeposit from applying to a magnetic tape recorder for computer system working, for example, in banks or the like.

Accordingly, a serviceability of this kind of data recorder will be enhanced to expand the applicable field.

SUMMARY OF THE INVENTION

In view of the foregoing, an object of this invention is to provide a data recording and/or reproducing apparatus capable of improving a bit error rate more outstandingly than in the prior art.

The foregoing object and other objects of the invention have been achieved by the provision of a data recording and/or reproducing apparatus 10 for recording and reproducing file data DATA by processing the file data DATA on the unit of a predetermined block length, wherein supplement data for effecting undercompensation of the block length is added to the file data DATA having a data quantity which is not an integer multiple of the block length, and the file data is set invariably to an integer multiple of the block length.

The supplement data PD1 for effecting the undercompensation of the block length is added to the file data DATA having the data quantity which is not the integer multiple of the block length. The file data are invariable multiplied by the integer of the block length. The file data DATA are processed on the block unit. The bit error rate can be thereby improved remarkably.

Further these have been achieved by the provision of a data recording and/or reproducing apparatus 10 for recording and/or reproducing a predetermined data with a predetermined record format, wherein when a data block DATA and information data SCD, PD1, C3 for identifying the data block DATA having a smaller data quantity than a data quantity of first record region TR decided on the basis of the record format are recorded on the first record region TR, a supplement data PD2 in accordance with the information data SCD, PD1, C3 is recorded in addition to the data block DATA and the information data SCD, PD1, C3 on a region other than the data block DATA and the information data SCD, PD1, C3 within the first record region TR.

Thus by recording the supplement data PD2 in accordance with the information data SCD, PD1, C3 on a margin region of the first record region TR, the information data SCD, PD1, C3 is accurately double recorded and reproduced in addition to that data block DATA is recorded on the every record regions, thereby the bit error rate is remarkably improved.

Furthermore these have been achieved by the provision of a data recording and/or reproducing apparatus 10 for recording and/or reproducing a predetermined data with a predetermined record format, wherein when a data block DATA having a smaller data quantity than a data quantity of first record region TR decided on the basis of the record format is recorded on the first record region TR, a supplement data is added to a region other than the data block DATA and an information region SCD, PD1, C3 of said data block DATA within the first record region TR, and the data block DATA is recorded on the first record region TR.

Thus by recording the supplement data PD2 on a region other than the data block DATA and an information region SCD, PD1, C3 of the data block DATA, the data block can be record processed data block DATA for every first record region TR.

The nature, principle and utility of the invention will become apparent from the following detailed description when read in conjunction with the accompanying drawings in which like parts are designated by like reference numerals or characters.

BRIEF DESCRIPTION OF THE DRAWINGS

In the accompanying drawings:

FIGS. 5A and 5B are schematic diagrams of assistance in explaining a record format on the magnetic tape;

FIG. 6 is a schematic diagram of assistance in explaining an interleave process between recording tracks;

DETAILED DESCRIPTION OF THE INVENTION

Figure 3:
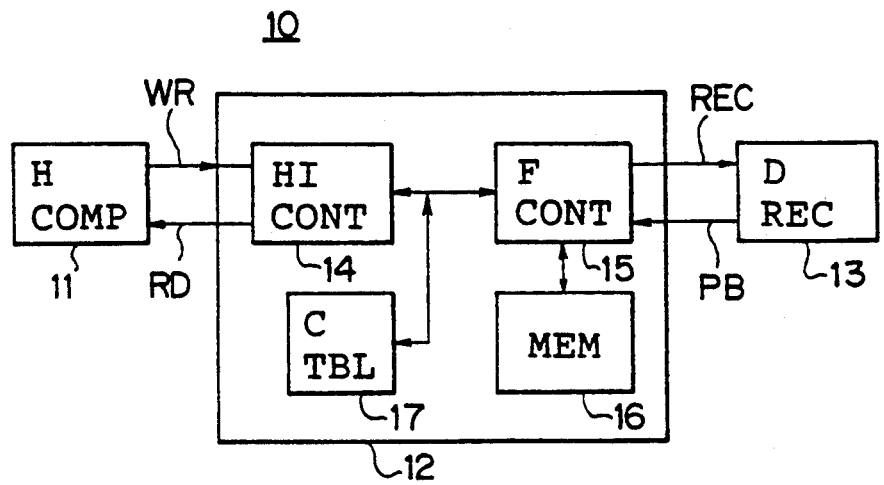
FIG. 3 is a block diagram illustrating a whole construction of a computer system to which a data recording and/or reproducing device of the present invention is applied.

Preferred embodiments of this invention will be described with reference to the accompanying drawings:

In FIG. 3 a reference numeral 10 denotes a schematic construction of a computer system to which the present invention is applied wherein write data WR sent from a host computer 11 along with a write request is supplied to a data recorder 13 of ID-1 format as recording data REC through a data recorder control unit 12, and thus the write data WR is written in a recording track on the magnetic tape 1.

Then the magnetic tape I of the data recorder 13 is reproduced according to a read request inputted from the host computer 11, and reproducing data PB obtained in result is inputted to the host computer 11 as read data RD through the data recorder control unit 12.

The data recorder control unit 12 comprises a host interface control part 14 and a format control part 15, the host interface control part 14 controls a channel interface against the host computer 11, and the format control part 15 formats data transferred to the data recorder 13 by means of a memory 16.

Then, control information between the host interface control part 14 and the format control part 15 is transferred by reference to a control table 17.

Thus in the computer system 10, the data recorder control unit 12 provided as above is available to using the data recorder 13 as an external memory of the host computer 11 through the interface similar to a conventional magnetic tape recorder on a side of the host computer 11.

Figure 4A:
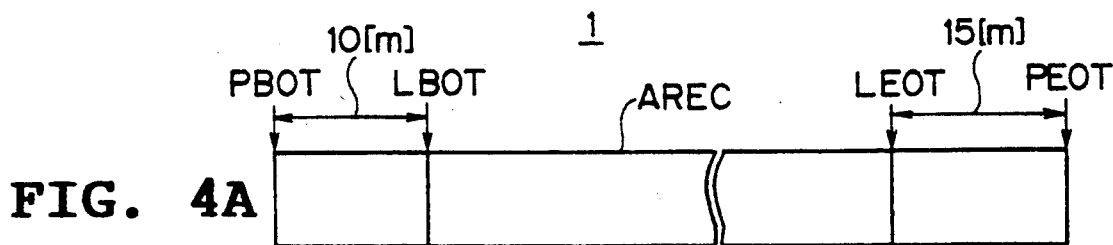
FIGS. 4A and 4B are schematic diagrams illustrating recording areas on a magnetic tape.
Figure 4B:
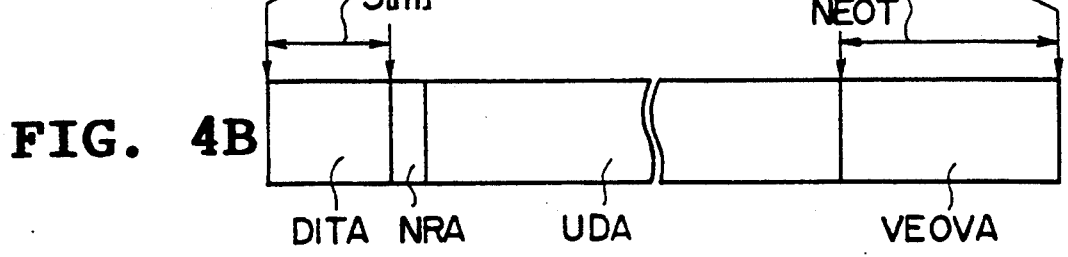

Here in the computer system 10, as shown in FIGS. 4A and 4B, a central portion of the magnetic tape 1 loaded in the data recorder 13 which is comparatively less in damage rate of the tape itself longitudinally is intended for a recording area AREC, thereby enhancing a bit error rate.

That is, as shown in FIG. 4A, a position 10 [m] behind, for example, from a physical tip PBOT of the magnetic tape I is specified as a logical tip LBOT, a position 15 [m], for example, in front of a physical end PEOT of the magnetic tape I is specified as a logical end LEOT, and an area covering the logical tip LBOT to the logical end LEOT is intended for the recording area AREC.

In the recording area AREC, as shown in FIG. 4B, an area covering the logical tip LBOT to a position 5 [m] behind, for example, therefrom is intended for a directory information track area DITA.

Further, following the directory information track area DITA, an area covering the logical end LEOT to an end or around NEOT coming 10 [m], for example, in front thereof across a non-recorded area NRA is intended for user's recording track area UDA, and an area exceeding the end or around NEOT as far as the logical end LEOT is intended for a volume end information area VEOVA.

Here, in the computer system 10, a user data area 36,108 [BYTE] per recording track which is specified by ID-1 format is formatted as shown in FIGS. 5A and 5B, and the formatted data is interleaved in 4 tracks, thereby enhancing a bit error rate.

That is, in the computer system 10, as shown in FIG. 5A, the write data WR from the host computer 11 is recorded as 32,768 [BYTE] recording data DATA comprising 1 block, for example, per recording track with 4 tracks as one set.

In this case, as for the recording data DATA coming less than 32,768 [BYTE] per recording track TR, a first supplement data PD1 is added to be 32,768 [BYTE] as whole. Then, a subcode data SCD for 320 [BYTE] is prepared for loading additional information of the recording track TR.

Moreover, in the data recorder control unit 12, 8 [BYTE] Read-Solomon error detecting/correcting code (hereinafter called C3 code C3 according to the C1 and C2 codes in ID-1 format) is added, as shown in FIG. 5A, by means of a predetermined generator polynomial at every 94 [BYTE] of the subcode data SCD, the recording data DATA or the first supplement data PD1, an error correction can be carried out more securely thereby, and thus a bit error rate can further be enhanced.

Further, as shown in FIG. 6, for the subcode SCD, the recording data DATA, the first supplement data PD1 and the C3 code C3 thus formatted per recording track, data for four recording tracks TR1, TR2, TR3 and TR4 is interleaved among the tracks according to a predetermined process, thereby enhancing the bit error rate further.

Then a second supplement data PD2 of 204 [BYTE] is added in a margin ahead of region contiguously data for each recording the track interleaved for the four recording tracks TR1, TR2, TR3 and TR4, and thus data content for one recording track TR amounts to 36,108 [BYTE]specified by ID-1 format.

Then, from formatting the second supplement data PD2 ahead as above, the supplement data PD2 can be assigned to a magnetic head running-in portion of the recording tracks where the magnetic tape I is capable of damaging in most cases and a tracking is not stable, thereby enhancing further the bit error rate for the recording data DATA.

Here in the case of computer system 10, additional information loaded in the subcode data SCD comprises track classification information TRID indicating a classification of the corresponding recording track TR, a block number BLNO that the recording track TR belongs, a file number FLNO that the recording track TR belongs, a write retry frequency RTCT with reference to the recording tracks and a byte count BYCT of data included in the recording tracks.

Classification information of volume information table VIT, file information table FIT, update information table UIT, dummy data track information DMY or recording end information EOR is recorded in the track classification information TRID.

Figure 7:
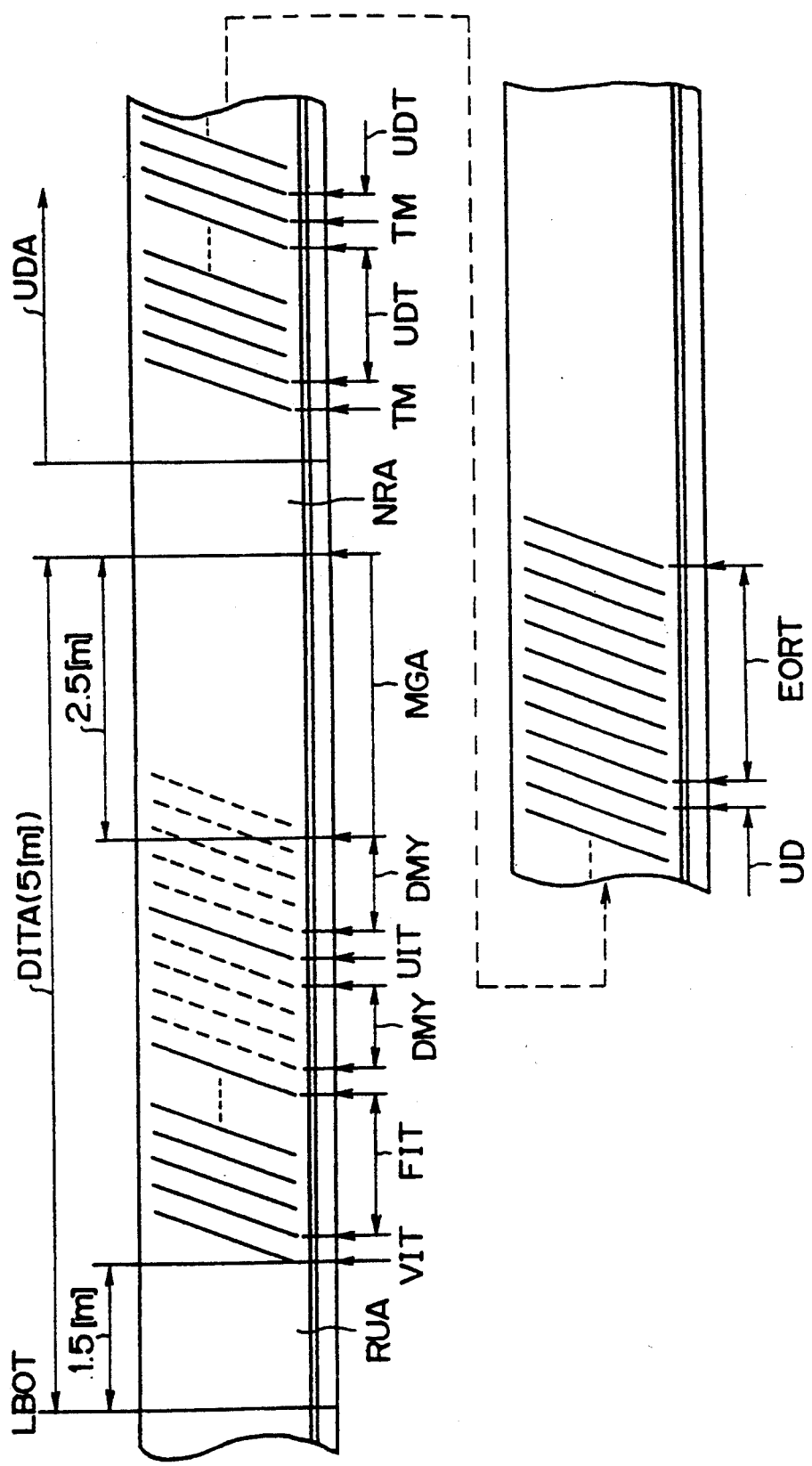
FIG. 7 is a schematic diagram of assistance in explaining a track format on the magnetic tape.

Here, as shown in FIG. 7 practically, volume information table VIT, file information table FIT, update information table UIT or dummy data track information DMY is used as the track classification information TRID of the recording track TR formed in the directory information track area DITA of the magnetic tape I first.

The directory information table DIT for managing files on the magnetic tape I as a whole is recorded in the directory information track area DITA, and the recording track comprising volume information table VIT is recorded first in a set of four tracks continuously to a 1.5 [m] rise area RUA from the logical tip LBOT of the magnetic tape 1.

First and final position information of the data block recorded in the user recording track area UDA with the whole magnetic tape I as one volume, length information of the file information table FIT and a block number of the data block wherein write retry has been executed in recording are recorded in the recording data DATA of the volume information table VIT.

The file information table FIT is recorded in 256 tracks continuing to the volume information table VIT. A first position information and a block length of the file are recorded in the recording data DATA of the file information table FIT in the unit of file recorded in the user recording track area UDA.

Further the dummy data track information DMY is recorded in succession to the file information table FIT in a predetermined track number, and the update information table UIT is recorded in the following four recording tracks. Information indicating whether or not updated is recorded in the recording data DATA of the update information table UIT.

Further in succession to the update information table UIT, dummy data track information DMY is recorded in the recording track 2.5 [m] from the first of the directory information track area DITA, and the remaining 2.5 [m] directory information track area DITA is secured as a margin area MGA.

Next, the user data track information UDT, the tape mark track information TM or the recording end information EOR is used as the track classification information TRID of the recording track TR formed in the user recording track area UDA across the non-recording area NRA in succession to the directory information track area DITA of the magnetic tape 1.

The recording track TR of the user data track information UDT for a plurality of blocks constructing one file is recorded among the recording tracks TR of the tape mark track information TM with four tracks as one unit as the recording track TR of the user recording track area UDA, and the recording track TR of the recording end information EOR is recorded in succession to the last of the user data track information UDT.

Then, the first supplement data PD1 32,768 [BYTE] is recorded in the recording data DATA of the tape mark track information TM and the recording end information EOR, and data corresponding to the write data WA inputted from the host computer 11 is recorded in the recording data DATA of the recording track TR of the user recording track area UDA.

Thus, in the computer system 10, the directory information track area DITA is provided ahead of the magnetic tape 1, and a content of the user recording track area UDA is controlled in files, thus data recorded in the data recorder 13 is accessible like an external recording apparatus viewed from the host computer 11.

Figure 8:
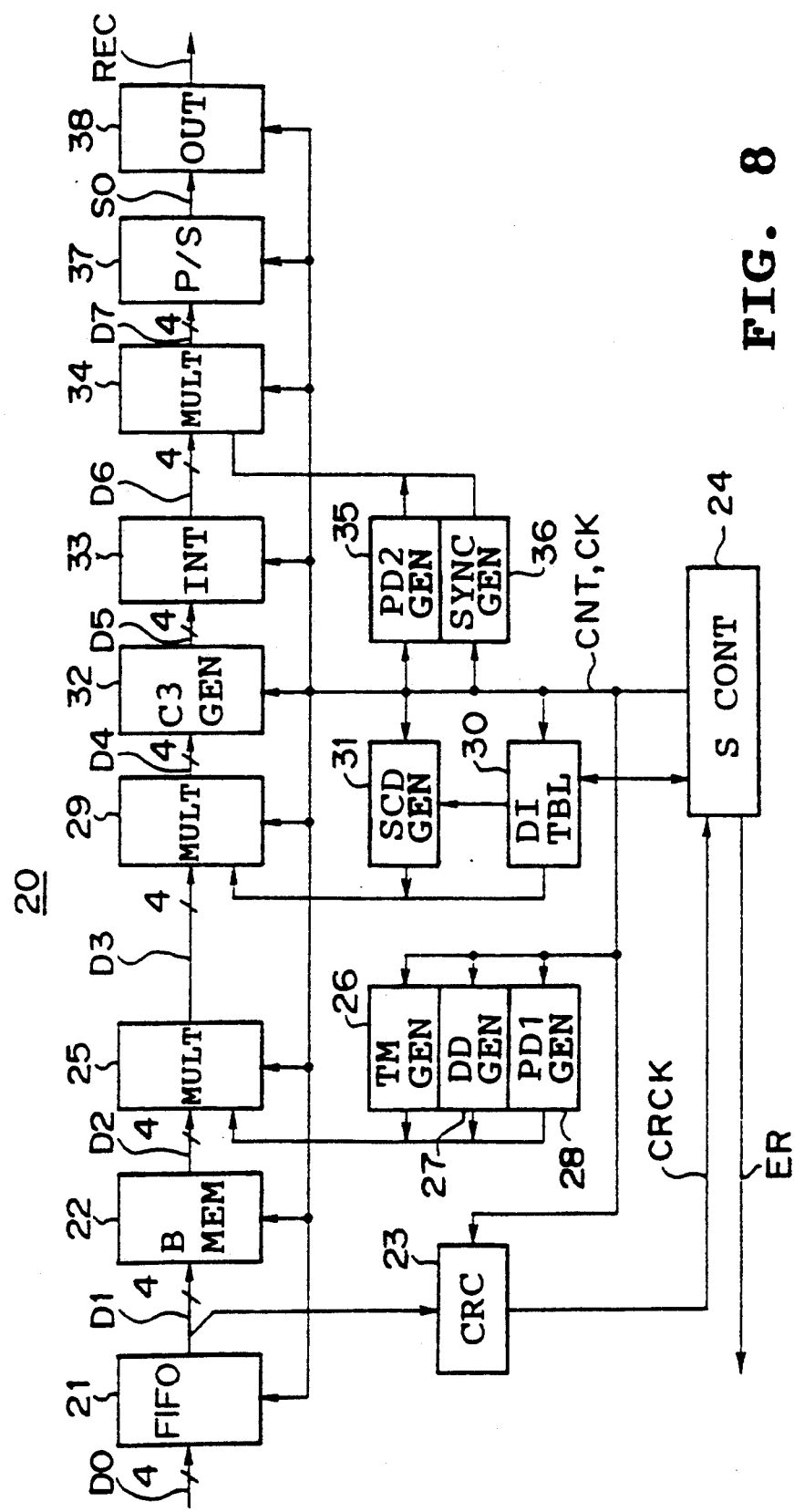
FIG. 8 is a block diagram illustrating a record format control portion.
Figure 9:
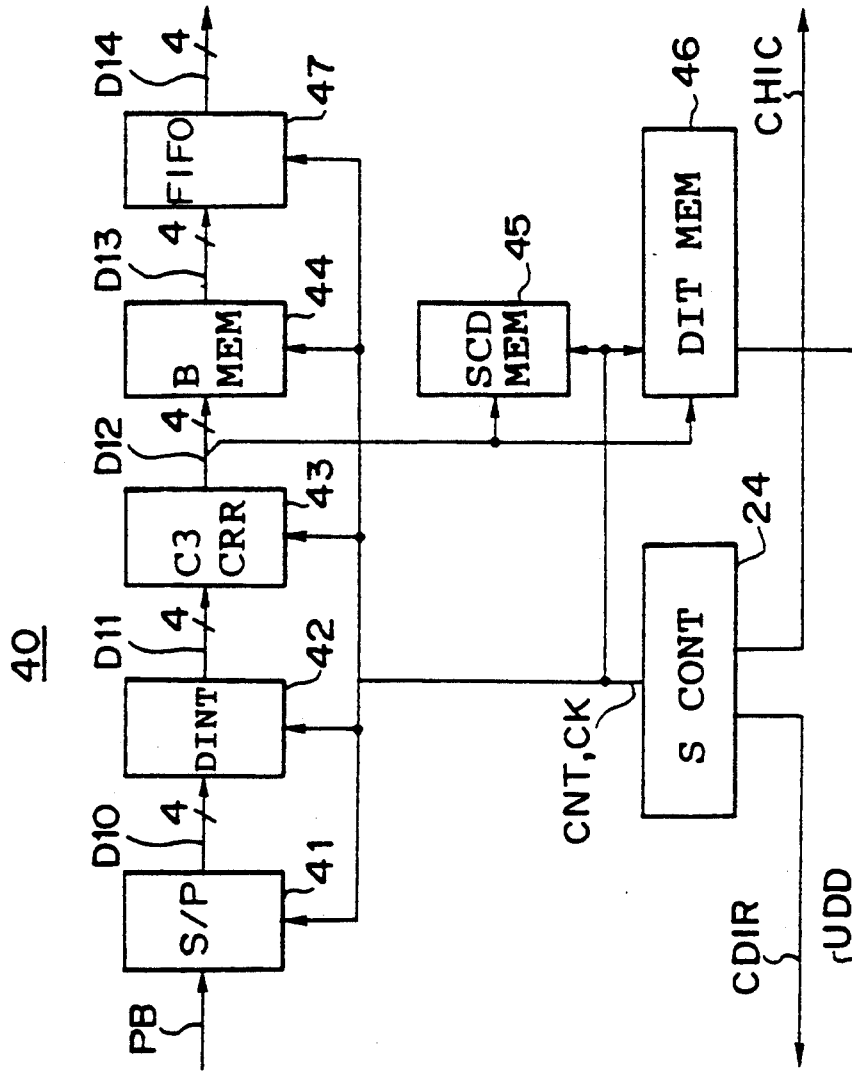
FIG. 9 is a block diagram showing a reproduction format control portion.

Here, the format control part 15 of the data recorder control unit 12 in the computer system 10 comprises a recording format portion 20 and a reproducing format portion 40 as shown in FIG. 8 and FIG. 9 along with the memory 16.

That is, in the recording format control portion 20, from inputting data at every 32 bits to a memory (comprising first-in-first-out (FIFO)) circuit 21 from the host interface control part 14 as 4-channel 8-bit parallel write data D0, the write data D0 is synchronized with an internal clock CK, which is written in a buffer memory 22 as input data D1 and sent to a CRC error detection circuit 23.

Then, in the recording format control portion 20, the write data D0 is processed at every 4 channels, however, data for one channel will be referred to for description of the recording format control portion 20.

The CRC error detection circuit 23 carries out an error detection on the input data D1 by means of CRC (cyclic redundancy code), and inputs a detection result CRCK to a system control circuit 24 in a computer configuration including CPU.

Then, when detecting an error of the input data D1 according to the detection result CRCK of the CRC error detection circuit 23, the system control circuit 24 sends it back to the host interface control part 14 as an error detection signal ER.

As a result, for example, the host interface control part 14 executes resending with reference to the write data DO in which an error is present.

The buffer memory 22 buffers one recording track TR as described with FIGS. 5A and 5B with reference to the input data D1, and sends a first buffer data D2 according to the recording data DATA obtained consequently to a first multiplexer 25.

In addition to the first buffer data D2, a first supplement data PD1 for the tape mark track information TM sent from a tape mark generation circuit 26, dummy data for the dummy data track information DMY sent from a dummy data generation circuit 27, and the first supplement data PD1 to the recording data DATA sent from a supplement data generation circuit 28 are inputted each to the first multiplexer 25.

Thus the first multiplexer 25 generates a second buffer data D3 by adding the first supplement data PDI to the recording data DATA of the first buffer-data D2 according to a control signal CNT inputted from the system control circuit 24, and sends it to a second multiplexer 29.

In addition to the second buffer data D3, the directory information table DIT sent from a directory information table memory 30, and the subcode data SCD generated in a subcode generation circuit 31 according to a content of the directory information table 30 are inputted to the second multiplexer 29.

Practically, the directory information table DIT described with FIG. 7 is stored in the directory information table memory 30, and the subcode generation circuit 31 generates first and last position information of the data block, length information of the file information table FIT and a block number of the data block having executed rewrite in recording according to a content of the directory information table DIT.

Thus the second multiplexer 25 forms the format described with FIGS. 5A and 5B by adding the subcode data SCD to the second buffer data D3 according to the control signal CNT inputted from the system control circuit 24, and then sends it to a C3 code generation circuit 32 as third buffer data D4.

AS described with FIGS. 5A and 5B, the C3 code generation circuit 32 generates the C3 code C3 of 8 [BYTE] to add it to the third buffer data D4, and sends a recording track data D5 obtained consequently to an interleaving circuit 33.

The interleaving circuit 33 executes interleaving for the four tracks shown in FIG. 6 by loading a recording track data D5 for the four tracks into an interleave memory in sequence and outputting it in the predetermined order, and then sends second recording track data D6 obtained consequently to a third multiplexer 34.

In addition to the second recording track data D6, the second supplement data PD2 sent from a second supplement data generation circuit 35, and synchronizing code data sent from a synchronizing code generation circuit 36 are inputted to the third multiplexer 34.

Thus the third multiplexer 34 adds the second supplement data PD2 and the synchronizing code data to the second recording track data D6 according to the control signal CNT inputted from the system control circuit 24, and sends a third recording track data D7 thus obtained to a parallel-serial conversion circuit 37.

The parallel-serial conversion circuit 37 converts the 4-channel 8-bit parallel third recording track data D7 into a serial record data SO for 32 bits, which is inputted to the data recorder 13 as recording data REC through an output circuit 38.

Figure 1:
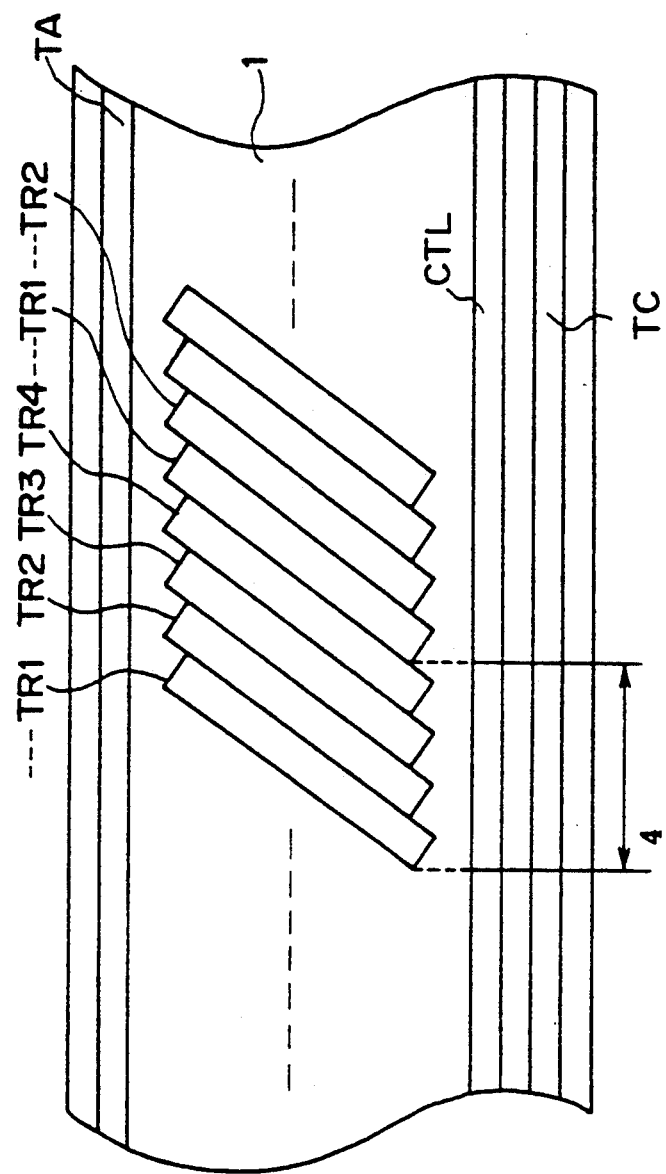
FIG. 1 is a schematic diagram of assistance in explaining the recording format on an ID-1 formatted magnetic tape.
Figure 2:
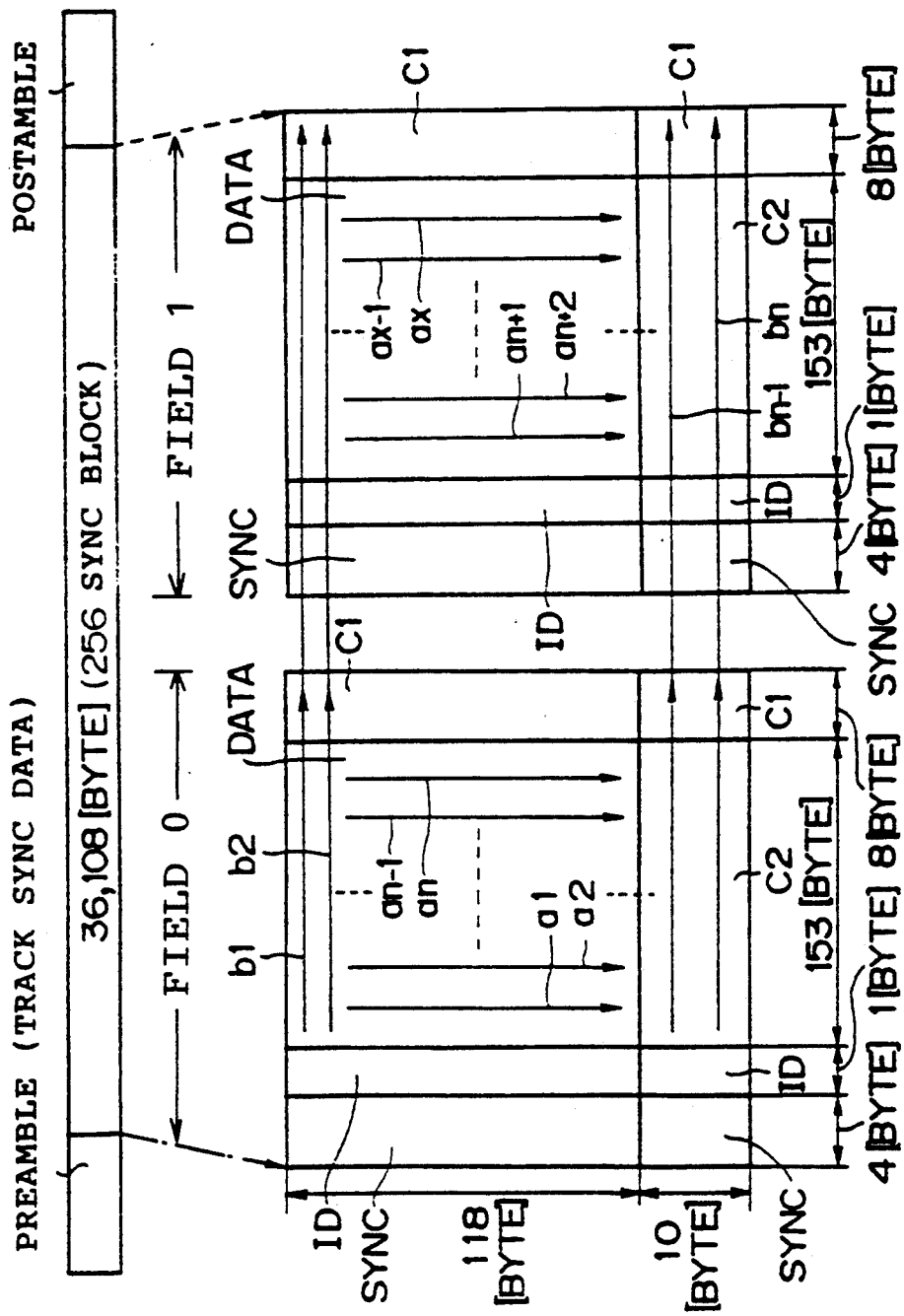
FIG. 2 is a schematic diagram of assistance in explaining an interleave process based on the ID-1 format.

Thus, the recording format control portion 20 of the format control part 15 executes formatting described with FIGS. 5A and 5B to FIG. 7 for the write data DO inputted from the host interface control part 14, generates the recording data REC accordingly, and then records it in the magnetic tape I according to ID-format as shown in FIG. 1 and FIG. 2.

Here, in a reproducing format portion 40 shown in FIG. 9, a serial reproducing data PB reproduced by the data recorder 13 is inputted to a serial-parallel conversion circuit 41, converted into a 4-channel 8-bit parallel first reproducing data D10, which is inputted to a deinterleaving circuit 42.

The deinterleaving circuit 42 carries out deinterleaving corresponding to interleaving of the interleaving circuit 33 by loading in the first reproducing data D10 in sequence as in the case of the interleaving circuit 33 of the recording format portion 20 and outputting in the predetermined order, and inputs a second reproducing data D11 obtained consequently to a C3 error correction circuit 43.

The C3 error correction circuit 43 carries out an error correction for the second reproducing data D11 by means of the C3 code C3 added by the C3 code generation circuit 32 of the recording format portion 20, and sends a third reproducing data D12 thus obtained.

Practically, of the third reproducing data D12, which corresponds to the user recording data track UDT, as shown in FIG. 7, is inputted to a buffer memory 44, and which corresponds to the directory information table DIT is inputted to a subcode memory 45 and a directory information table memory 46.

In the buffer memory 44, the first supplement data PD1 included in the third reproducing data D12 is deleted, inputted to a memory circuit 47 as a fourth reproducing data D13 and synchronized with an external clock, and is then sent to the host interface control part 14 as read data D14 outputted from the reproducing format control portion 40.

Then, where the directory information table DIT inputted to the directory information table memory 46 is updated, the system control circuit 24 sends update information UDD of the directory information table DIT to the data recorder 13 together with a data recorder control signal CDIR, and updates a content of the directory information table DIT on the magnetic tape 1.

Further the system control circuit 24 sends an answer to the data reproducing request inputted from the host interface control part 14 to the host interface control part 14 as a control signal CHIC together with output data D14.

Thus the reproducing format control portion 20 of the format control part 15 subjects the reproducing data PB reproduced by the data recorder 13 to formatting counter to the formatting described with FIGS. 5A and 5B to FIG. 7, generates the read data D14 and sends it to the host interface control part 14.

Figure 10:
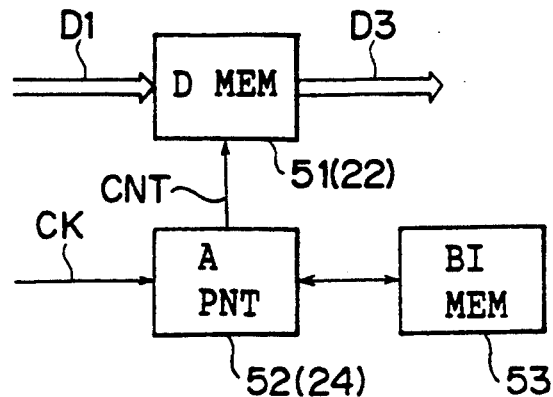
FIG. 10 is a block diagram illustrating a construction of a first supplement data adding unit in one embodiment of the present invention.
Figure 11:
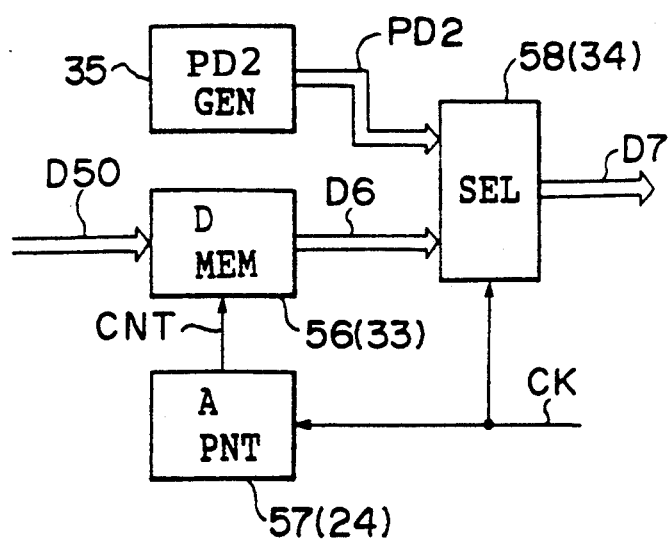
FIG. 11 is a block diagram illustrating a construction of a second supplement data adding unit.

Referring to FIGS. 10 and 11, the numerals 50 and 55 represent first and second supplement data adding units, respectively. Shown therein are construction for adding the first and second supplement data PD1 and PD2 by use of the record format control part 20.

More specifically, in the first supplement data adding unit 50, the input data D1 is inputted to a data memory 51 partially constituting a buffer memory 22 of the record format control part 20.

This data memory 51 is constructed by including a plurality of memory blocks on I block unit (e.g., 32,768 [BYTE]) in accordance with the data quantity of the recording data DATA for, e.g., one recording track TR.

Besides, the writing/reading operations of this data memory 51 are controlled in accordance with data addresses supplied as control signals CNT from an intra address pointer 52 of the system control circuit 24 according to the internal clocks CK.

Upon a start of input of the input data D1, the address pointer 52 sequentially writes the input data D1 per memory block from the predetermined memory blocks. Simultaneously, the address pointer 52 writes head block information consisting of block numbers, etc. of the memory blocks to a block information memory 53.

As matter of fact, the input data D1 are inputted from the host interface control unit 14 on the file unit. Upon a completion of the input data D1 for 1 file, the data addresses come to end typically in the course of the memory blocks.

The address pointer 52 writes, to the block information memory 53, the last block information consisting of the block numbers, etc. of the memory blocks at that time, thus finishing the input process of the input data D1 for 1 file.

The input data D1 thus written to the data memory 51 are read under control of the system control circuit 24. At this time, the address pointer 52 generates the data addresses sequentially from the heads of the memory blocks corresponding to the head block information of the block information memory 53. Input data read in this way are inputted to a second multiplexer 29.

This reading process from the memory blocks continues up to the memory block corresponding to the last block information of the block information memory 53. As a result of this, the first supplement data PD1 can be added to exhibit an integer multiple of the block (i.e., the recording data DATA for one recording track TR) for 1 file of the input data D3.

Thus, as a matter of fact, in the first supplement data adding unit 50, the first supplement data PD1 can, as illustrated in FIG. 5, be added easily by processing the block information corresponding to one recording track TR without performing a complicated process to separately generate the first supplement data PD1 by the supplement data generation circuit 28.

On the other hand, in the second supplement data adding unit 55 depicted in FIG. 11, interleave-processed recording track data D50 are recorded sequentially on a data memory 56 partially constituting the interleave circuit 33 of the record format control part 22.

This data memory 56 is, as described above referring to FIGS. 5 and 6, constructed by including a plurality of memory blocks having a data quantity 35,904 [BYTE] for one recording track TR, which is to be interleave-processed. A supplement data generation circuit 35 is arranged to generate the second supplement data PD2 for 204 [BYTE].

Note that the data memory 56 executes the writing/reading operations in accordance with the data addresses supplied as the control signals CNT from the address pointer 57 of the system control circuit 24 according to the internal clocks CK.

Recording track data D50 which have been in effect interleave-processed are inputted to the data memory 56 are thereupon written sequentially to the memory blocks per data quantity 35,904 [BYTE] for one recording track TR.

The reading process from the memory block is executed per block having the data quantity 35,904 for one recording track TR, and recording track data D6 obtained thereby are inputted to a selector circuit 58 partially constituting the third multiplexer 34.

Note that in advance of the reading process from each memory block, the selector circuit 58 is arranged to transmit the second supplement data PD2 inputted from the supplement data generation circuit 35 during a period corresponding to 204 [BYTE]. Thereafter, the recording track data D6 per block are transmitted.

Thus, in the second supplement data generating unit 55, as a whole, the second supplement data PD2 of 204 [BYTE] is added to the head of the 35,904 [BYTE] data for one recording track TR, thereby generating the user's data on the one recording track unit of the data recorder 13 in the above-mentioned ID-1 format described above with reference to FIGS. 1 and 2.

Based on the construction discussed above, when the input data on the file unit does not become an integer multiple of the block having the data quantity on the one recording track unit, the supplement data is added, whereby the magnetic recording/reproducing device capable of processing the input data on the block unit is attainable.

Thus, the bit error rate is remarkably improved. It is possible to actualize the optimum magnetic recording and/or reproducing device as an external recording device of the host computer system 11.

The embodiment discussed above has dealt with a case where the data for every 4 tracks are interleave-processed. The present invention is not, however, limited to this. The data for, e.g., every 8 tracks may be interleave-processed.

The embodiment discussed above has dealt with a case where only the address is advanced when adding the first supplement data. Instead, however, various data may be added as the first supplement data. With this addition, the error can be detected by use of the first supplement data. Thus, the bit error rate can be further improved.

The embodiment discussed above has dealt with a case where the present invention is applied to the external storage device of the computer. The present invention is not, however, limited to this but may be applicable widely to a variety of magnetic recording and/or reproducing devices.

As discussed above, according to the present invention, in the magnetic recording and/or reproducing device for recording and/or reproducing the file data by processing the file data on the unit of predetermined block length, the supplement data for effecting under-compensation of the block length is added to the file data having the data quantity which is not an integer multiple of the block length. The file data are set invariably to the integer multiple of the block length. The magnetic recording and/or reproducing device capable of invariably processing the file data on the block unit can be thereby attained.

Thus, the bit error rate is remarkably improved on the whole. It is feasible to actualize the optimum magnetic recording and/or reproducing device as an external recording device of the host computer system.

Figure 12:
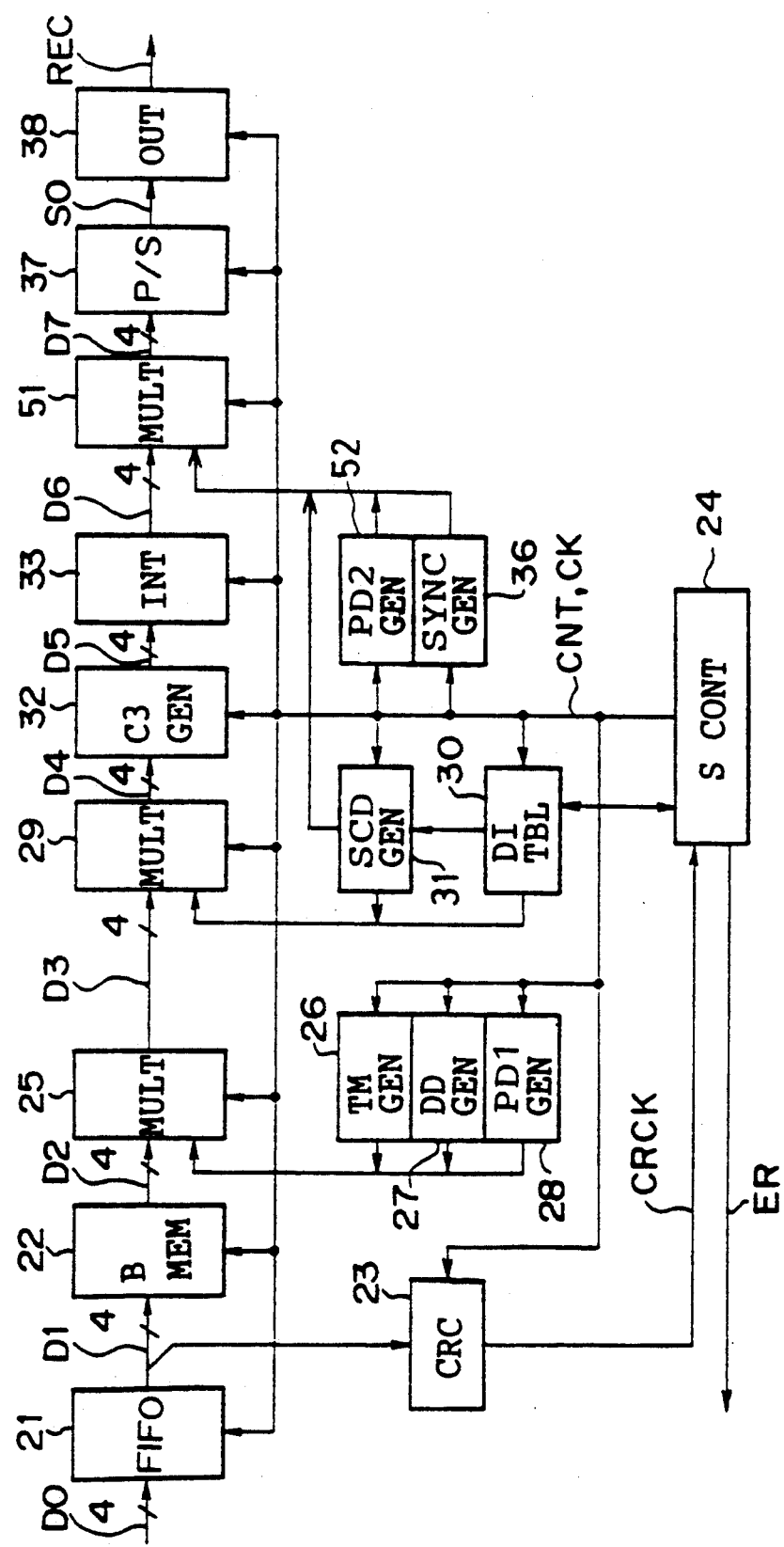
FIG. 12 is a block diagram illustrating a record format control portion of other embodiment.
Figure 13:
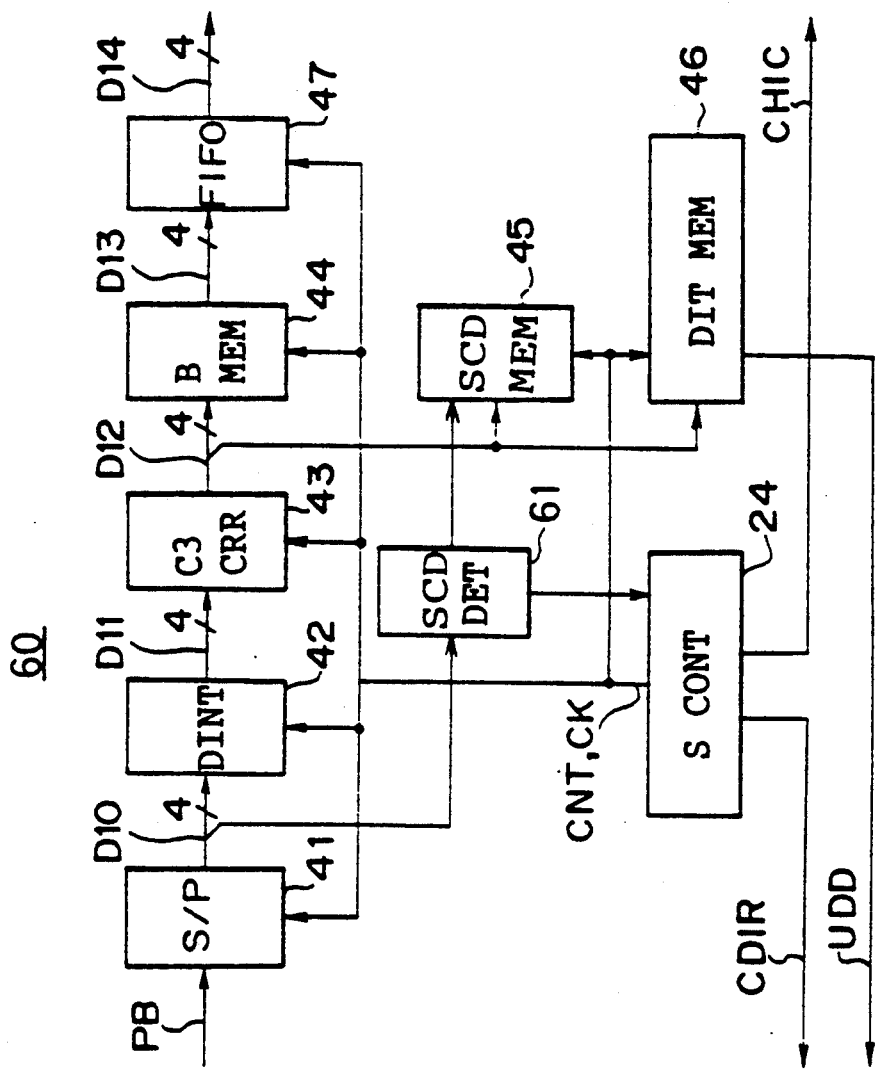
FIG. 13 is a block diagram illustrating a reproduction format control portion.

In FIGS. 12 and 13 shown parts corresponding to those of FIGS. 8 and 9 with the same numerals, 50 and 60 denote a record format control portion and a reproduction format control portion respectively. In the record format control portion 50, there is recorded the same subcode data SCD in second supplement data PD2 as described above with FIGS. 3 and 4, at a position other than the recording position of the latter.

That is, for the record format control portion 50, the subcode data SCD outputted from a subcode generation circuit 36 is inputted to the third multiplexer 51, in addition to the second record track data D6, the second supplement data PD2 and the synchronized code data described above with FIG. 6.

Thus, in the third multiplexer 51, the subcode data SCD is added to the record track data D6 corresponding to a control signal CNT inputted from the system control circuit 24 at the head, for example, of the term of recording the second supplement data PD2 as added. A third record track data D7 obtained as the result is sent to the parallel-serial conversion circuit 37.

The parallel-serial conversion circuit 37 converts the third record track data into the serial record data SO in the same manner described above with FIG. 6, which is inputted to the data recorder 13 through the output circuit 38 as the record data REC.

Thus, in the record format control portion 50 of this embodiment, in addition to the format processing in recording described above with FIGS. 3 to 5, the data recorder 13 records to a magnetic tape the data to be added the subcode data without C3 code C3 and non-interleave processed.

In the reproduction format control portion 60, the serial reproduction data PB reproduced in the data recorder 13 is inputted to the parallel-serial conversion circuit 41 and converted into the first reproduction data D10 therein which is inputted into not only the deinterleave circuit 42 but also a subcode detection circuit 61.

The recording position of the second supplement data within the first reproduction data D1 are monitored by the subcode detection circuit 61, which in turn writes into the subcode memory 45 the subcode data SCD which is outputted to the system control circuit 24, when the subcode data SCD is detected.

Practically, the system control circuit 24 stops the reproduction signal processing of the first reproduction data D1 in the deinterleave circuit 42, the C3 error correction circuit 43, the buffer memory 44, etc. so as to read the data for throwing away, if it, for example, is detected on the basis of the subcode data SCD inputted from the subcode detection circuit 61 that the first reproduction data D1 is not recorded as record data DATA, such as dummy data track information DMY, the tape mark track information TA, the record end information EOR etc..

The system control circuit 24 controls the reproduction format processing by using the subcode data SCD obtained from the subcode detection circuit 52, if there is not able to be accurately reproduced the subcode data SCD involved in the third reproduction data D12 obtained from the C3 error correction circuit 43.

Thus in the reproduction format control portion 60, the recording position of the second supplement data PD2 in the first reproduction data D1 is monitored to be possible of reproduction processing without the subcode data SCD obtained through the deinterleave circuit 42 or the C3 error correction circuit 43, if there is recorded the subcode data SCD in the second supplement data PD2. Therefore the speed of the reproduction processing itself comes to be higher.

When there is an error in the subcode data SCD sent from the deinterleave circuit 42 and the C3 error correction circuit 43 as described above the subcode data SCD recorded in the second supplement data PD2 is used for the reproduction processing to be able to improve the bit error rate in reproducing.

According to the construction described above, there can be provided the magnetic recording and/or reproducing apparatus in which the data can be recorded or reproduced on the every recording tracks in the data recorder with ID-1 format, by adding the supplement data to the data lesser than the user data of the one recording track of the ID-1 format data recorder.

Further according to the construction described above, there can provide the magnetic recording and/or reproducing apparatus in which the subcode data SCD can be double recorded and reproduced, and the speed of the reproduction processing itself comes to be higher, by recordings and/or reproducing to the subcode data into and/or from the supplement data.

For this, it can be provided the magnetic recording and/or reproducing apparatus which more improves in the bit error rate as a whole and is optimized as external storage device of a computer system 11.

Further as discussed above, according to the present invention, when the data block and the information data for identifying this smaller than the data quantity of first record region decided on the basis of the record format are recorded, the supplement data in accordance with the information data is recorded in addition to the information data on the margin region of the first record region, so that the information data! can be accurately double recorded and/or reproduced, in addition to that the data block can be recorded and reproduced on every first record regions. Thereby it can be provided the magnetic recording and/or reproducing apparatus in which the bit error rate is remarkably improved.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. An apparatus for processing file data having a data quantity for serial recording on a recording medium by assembling said file data in data blocks each having a predetermined block length, said apparatus comprising:

detecting means for detecting a data difference between said data quantity of said file data and an integer multiple of said predetermined block length;

first supplement data providing means for selectively providing first supplement data in response to the determination of said data difference, said first supplement data providing means being operative to provide said first supplement data in an amount selected to compensate for said data difference;

combining means for combining said first supplement data with said file data to form combined data corresponding to an integer number of said data blocks, so that the combination of said first supplement data with said file data yields a data quantity for producing an integer multiple of the predetermined block length;

error correction coding means for producing error correction codes for the combined file data and first supplement data; and interleaving means for interleaving said file data, said first supplement data and said error correction codes to form interleaved data, such that the effect of drop out errors can thereby be reduced.

2. The apparatus according to claim 1, wherein the combining means comprises:

data memory means for storing said file data in data blocks each having said predetermined block length;

address pointer means for generating data addresses for said data memory means; and block information means coupled to said address pointer means for storing block number information, and selectively supplying said block number information to said address pointer means being operative to access said file data having the first address to the last address according to said block number information stored in said block information memory means.

3. The apparatus according to claim 1, further comprising means for forming the interleaved data in an ID-1 format and means for recording the ID-1 format data in sequential tracks formed obliquely on a magnetic tape by means of a rotary head.

4. The apparatus according to claim 1, further comprising:

subcode data providing means for providing subcode data and inserting said subcode data in said data blocks having said predetermined block length.

5. The apparatus according to claim 4, wherein said interleaving means is operative to interleave the subcode data with the file data, the first supplement data and the error correction codes.

6. The apparatus according to claim 5, further comprising:

second supplement data generating means for generating second supplement data comprising redundant subcode data; and means for combining the second supplement data with the interleaved data.

7. The apparatus according to claim 6, further comprising:

first recording means for recording said interleaved data in a first record region of a recording medium; and second recording means for recording said second supplement data in a second record region of said recording medium.

8. The apparatus according to claim 7, wherein said second recording means further comprises means for recording said second supplement data in a margin region of said second record region.

9. The apparatus according to claim 6, in combination with:

first reproducing means for reproducing said subcode data from one of the interleaved data and the second supplement data; and second reproducing means for selectively reproducing said file data based upon the reproduced subcode data.

* * * * *

UNITED STATES PATENT AND TRADEMARK OFFICE
CERTIFICATE OF CORRECTION

PATENT NO. : 5,321,562
DATED : June 14, 1994
INVENTOR(S) : Shinji Hamada et al.

It is certified that error appears in the above-identified patent and that said Letters Patent is hereby corrected as shown below:

On the title page item [73], should read

--Sony Corporation, Tokyo, Japan and
Fujitsu Limited, Kanagawa, Japan--

Signed and Sealed this

Twenty-fifth Day of April, 1995

Attest:

BRUCE LEHMAN

*Attesting Officer*　　　*Commissioner of Patents and Trademarks*